May 11, 1954 W. A. MILLER 2,678,241
DISPENSING SILAGE
Filed Dec. 27, 1951 3 Sheets-Sheet 1

INVENTOR.
Wilbur A. Miller
BY
Soans, Haister + Anderson Attys

May 11, 1954  W. A. MILLER  2,678,241
DISPENSING SILAGE
Filed Dec. 27, 1951  3 Sheets-Sheet 2

INVENTOR.
Wilbur A. Miller
BY
Soans, Harsh & Andresen
Attys

May 11, 1954 W. A. MILLER 2,678,241
DISPENSING SILAGE
Filed Dec. 27, 1951 3 Sheets-Sheet 3
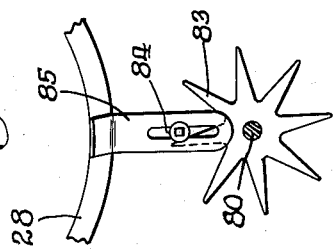
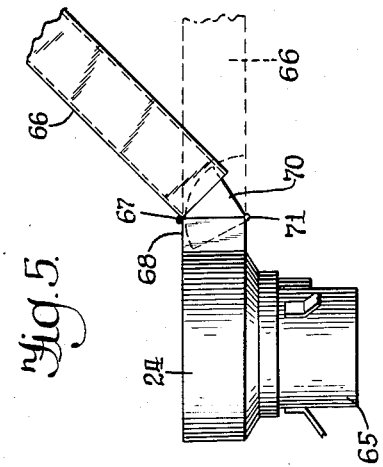
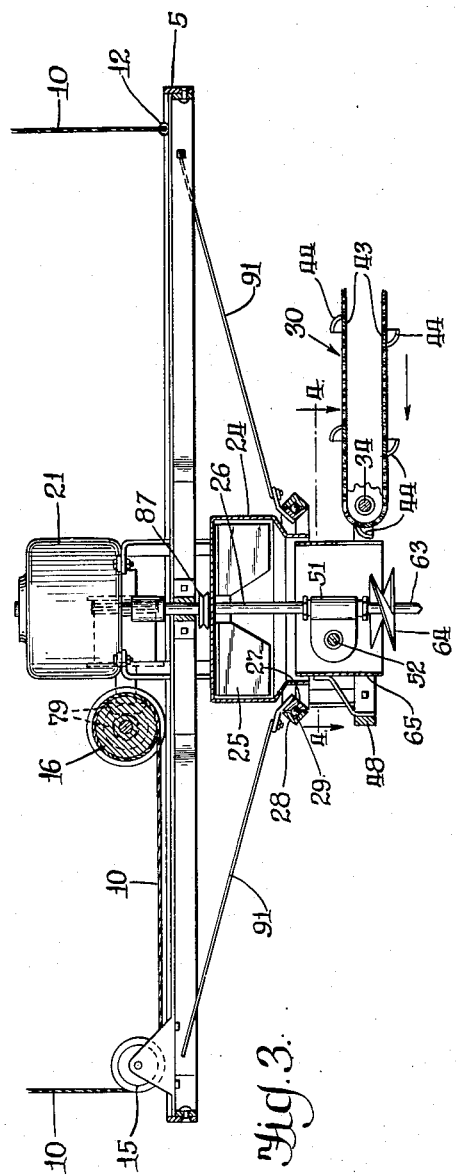
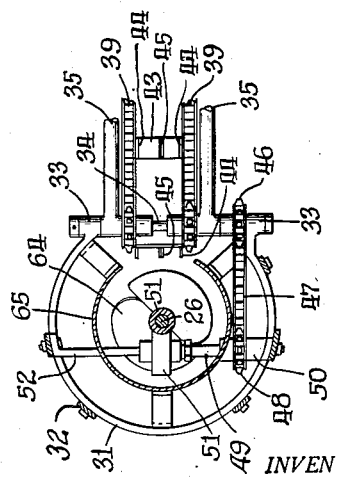
INVENTOR.
Wilbur A. Miller
BY
Evans, Haister + Anderson Attys.

Patented May 11, 1954

2,678,241

UNITED STATES PATENT OFFICE 2,678,241

DISPENSING SILAGE

Wilbur A. Miller, Marcus, Iowa

Application December 27, 1951, Serial No. 263,626

3 Claims. (Cl. 302—56)

This invention relates to improvements in a silage dispenser, that is to say, to improvements in a machine for dispensing silage from the top of the silage stored in a conventional silo.

The main objects of the invention are to provide a mechanism which will automatically loosen and discharge material from the top of packed feed material on silage stored in a silo; to provide such mechanism which will dispense the material uniformly from over the entire surface thereof and thereby; maintain an even level on the top of the stored silage so as to facilitate operation of the mechanism; to provide mechanism of the character indicated which will automatically, more or less as an incident to its operation, reduce the silage to a more suitable consistency than that in which the silage is usually delivered into the silo; and to provide such mechanism which will be wholly automatic in its operation so as to require no attention from an operator excepting such attention as may be required to start and stop the operation of the mechanism.

It is a further object of the present invention to provide mechanism having the capacities and characteristics above indicated and which will be dependable in use and durable, and other objects and advantages of the invention will be understood by reference to the following specification and accompanying drawings wherein there is illustrated an automatic silage dispenser embodying a selected form of the invention.

In the drawings,

Figure 3 is a cross section on the line 3—3 of Figure 1;

Figure 4 is a cross section on the line 4—4 of Figure 3;

Figure 5 is a fragmentary side elevation illustrating certain details which appear partially in Figures 1 and 2; and Figure 6 is a cross section on the line 6—6 of Figure 1.

Figure 1:
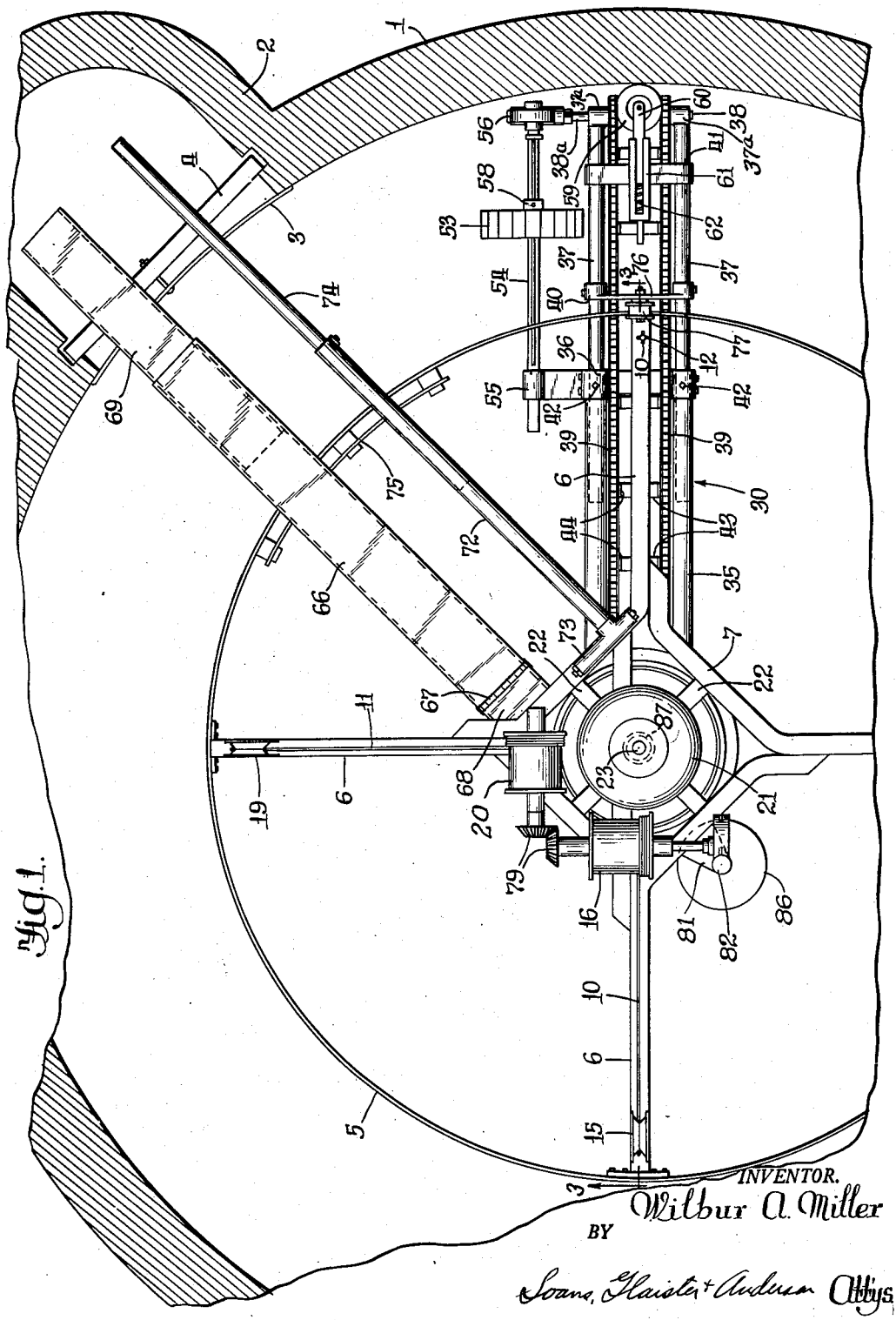
Figure 1 is a plan.
Figure 2:
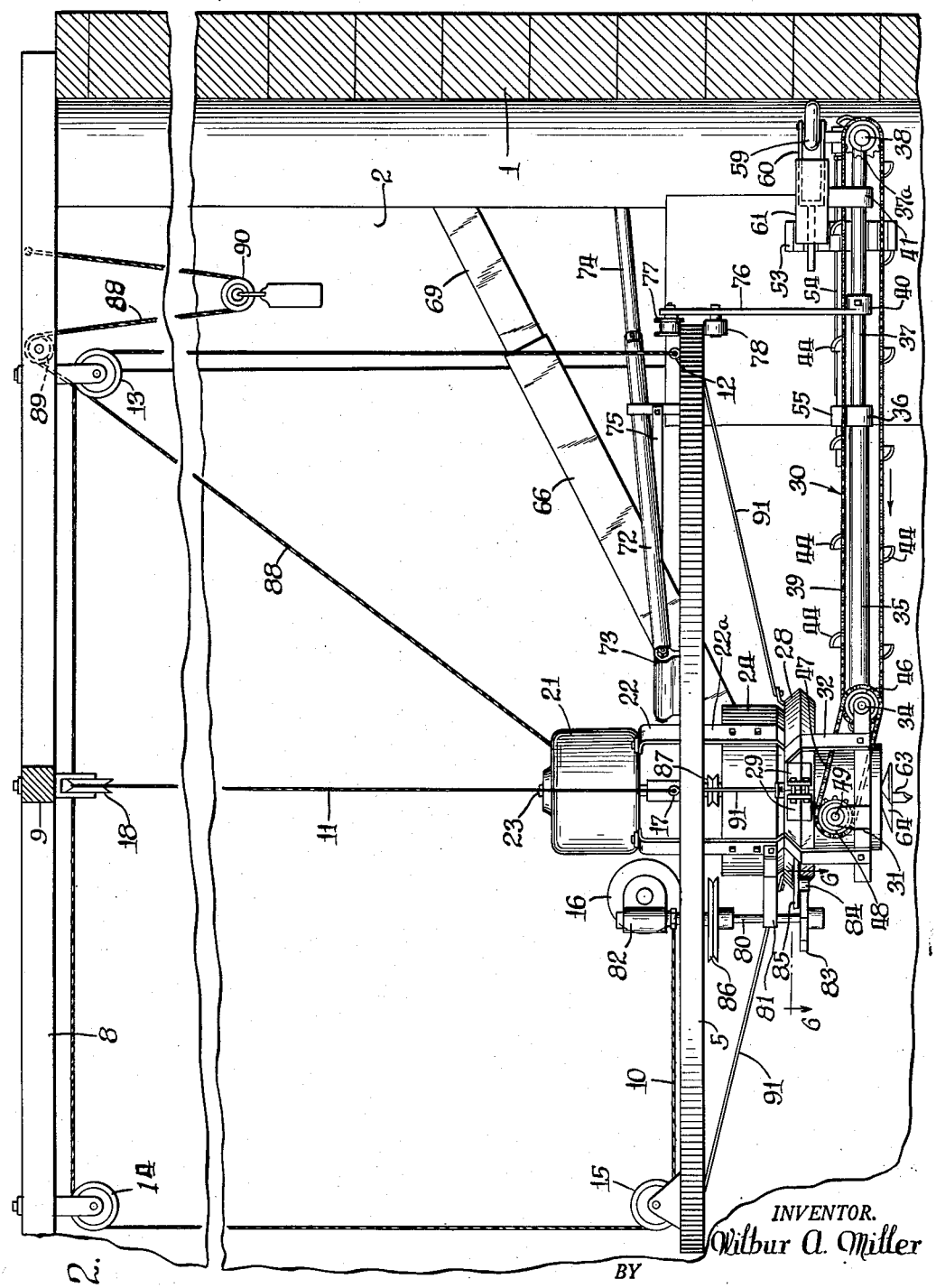
Figure 2 is a side elevation illustrating the automatic dispenser in operative position within a silo.

In the drawings, a portion of a conventional substantially cylindrical silo is represented at 1, the silo being provided with a feeding chute 2 as usual. The feed chute 2 is partitioned from the interior of the silo by a suitable form of gate construction which is here represented as embodying a series of gate units each comprising an arcuate plate 3 which fits inside the cylindrical wall 1 of the silo in substantial conformity to the curvature thereof, and a holding member 4, the ends of which are received in suitable grooves provided in the inside of the feed chute 2 and to which holding member the curved plate 3 is secured by a suitable clamping bolt as indicated. The gate sections may be made of any suitable height to facilitate removal one by one of the sections and to afford convenient access to the feed chute from progressively lowered levels of the silage in the silo.

The dispensing machine comprises a circular supporting frame member or track 5 which is fabricated from metal or other preferred material to provide the required degree of strength and rigidity. In this instance the circular track 5 is illustrated as being of metal construction reinforced by suitable angle iron members 6 which are rigidly secured at their outer ends to said track and have their inner ends bent so as to cooperate with each other to form a central rectangular frame portion 7, these inner end portions being suitably united as by welding, riveting or bolting to provide a strong and substantially rigid main frame structure. This frame structure supports the other parts of the mechanism and is itself vertically adjustably supported from the framing members of the roof of the silo or in the case of a flat top silo, from supports provided especially for that purpose such as here represented in the form of heavy wood cross beams 8 and 9 which rest on the top of the silo wall and extend at right angles to each other substantially diametrically across the silo. The supporting beams may of course, be of steel instead of wood.

Suitable steel or other flexible cables 10 and 11 are employed for vertically adjustably supporting the frame member comprising the parts 5, 6 and 7 from the said top supports 8 and 9. The cable 10 has one end secured as shown at 12 to one of the cross members 6 near the track 5 and said cable extends upwardly from its anchorage in the frame over a sheave or pulley 13 which is suspended from the supporting beam 8, thence across the top of the silo to the opposite side thereof and over and downwardly around a sheave 14, around another sheave 15 which is suitably mounted on another of the cross members 6 near the track 5, and thence inwardly to a winch drum 16 which is suitably journalled on the said frame structure.

The cable 11 is similarly anchored at one end as shown at 17 to one of the cross members 6 from where it extends upwardly and over sheaves such as indicated at 18 which depend from the top cross member 9, and thence downwardly around a sheave 19 on another cross member 6 and inwardly to another winch drum 20 which is similar to the winch drum 16. The cable 11 is in a plane at right angles to the plane at the cable 10 so that the track 5 is supported at four uniformly spaced points. It will be seen that by winding the cables 10 and 11 on the drums 16 and 20, the frame comprising the parts 5, 6 and 7 may be moved upwardly in the silo and that by paying out cable from the said drums, the said circular structure may be lowered within the silo. By controlling the paying out of cable from the drums 16 and 20, the descent of the circular frame structure and the silage dispensing mechanism carried thereby can be very effectively regulated to cause the dispensing mechanism to follow the level of silage downwardly at a rate of descent which is common to both so that a substantially constant working relationship may thereby be easily maintained between the dispensing mechanism and the top of the silage.

An electric motor 21 is disposed substantially coaxially of the annular track 5 and is supported in that position by means of a plurality of struts or bracket arms 22 which are suitably bolted or otherwise fastened to the central frame structure 7 in upwardly extending positions as shown, the upper end portions of said brackets being suitably secured to the motor 21 so as to support the same. As indicated, the motor is arranged with its shaft in an axially vertical position and the motor should accordingly be of a type which provides adequate support for the shaft 23 of the motor.

The brackets 22 also extend downwardly from the central frame portion 7 and have their lower end portions 22a secured to the casing or housing 24 of a turbine type fan or centrifugal blower which includes a rotor 25 carried by a shaft 26. This blower shaft 26 is suitably journalled in a bearing provided in the blower housing in the usual manner and said shaft is extended upwardly and connected directly to the motor shaft 23 so that the blower is driven by the motor.

Said lower portions 22a of the brackets also continue downwardly below the blower structure and have their lower extremities secured to a circular ball race 27 which, as shown in Figure 3, is of angle iron construction bent to the required circular form with the interior angle of the member facing outwardly to form a ball race. It will be seen that the supporting brackets 22, being fastened to the stationary central frame part 7, serve to support the motor, the blower and said ball race 27 in fixed relation to each other.

An outer ball race 28 also formed of angle iron and complementary to the inner race 27 is associated with said inner race to cooperate therewith to house anti-friction ball bearings 29 so that said outer race is quite freely rotatable relative to the normally fixed inner race. The end portions of the angle member from which the outer race 28 is formed are provided with suitable clamping brackets 29, 29 which are respectively secured to said end portions. Suitable bolts extend through legs of the brackets 29, 29 to clamp the ends of said member tightly in abutting relation so as to maintain the outer race in closed condition about the inner race and the ball bearings. Adjustment of the fit of the outer race about the bearing balls is easily accomplished by providing shims between the ends of the member or by dressing down said ends to reduce the diameter if required. The balls are inserted before closing the outer race completely and become effectively caged as soon as the outer race is closed in the manner indicated.

The outer race of the ball bearing structure supports a cutting conveyor 30 so that the conveyor is rotatable in a substantially horizontal plane about the axis of the motor shaft 23 and the ball bearing structure just described, said axis approximately coinciding with the axis of the silo. For connecting the cutting conveyor 30 to said outer bearing race 28, a partial ring bracket 31 is suspended from said outer bearing race by means of a plurality of hangers 32 which have their upper ends welded or otherwise suitably secured to said outer race and their lower ends welded, bolted or otherwise suitably secured to said bracket 31. As best shown in Figure 4, this bracket 31 terminates in journal bearings 33, 33 in which a shaft 34 is journalled, said shaft 34 having journalled thereon, conveyor side frame rods 35, 35.

The conveyor sides 35 have free ends interconnected by means of a cross member 36 and said sides are preferably of tubular form and telescopically receive members 37, 37, the outer ends of which are provided with suitable journal bearings 37a, 37a which rotatably support a shaft 38. The shaft 38 and the aforesaid shaft 34 each have secured on them a pair of sprockets which receive conveyor chains 39, 39. The side frame connecting member 36 extends across the conveyor between the upper and lower reaches of said chains. Said conveyor side frame extenders 37, 37 are also advantageously interconnected in the required spaced relationship by cross members such as indicated at 40 and 41 which in this instance bridge over the conveyor chains. These connecting members 36, 40 and 41 may of course be anchored in fixed position on the respective side members by bolting, set screws or in any other selected manner and the side frame extensions 37, 37 may be locked in selected position of adjustment relative to the main side frames 35, 35 by appropriately positioned set screws 43 or otherwise as may be preferred.

The conveyor chains 39, 39 are interconnected at suitable intervals along their lengths by cross members such as indicated at 43 which carry cutting knives 44 at their ends and 45 intermediate their ends. These cutting knives may be detachably secured to the cross members to facilitate removal for sharpening or replacement purposes but they are preferably welded or otherwise rigidly attached to the cross members 43 and the cross members secured to links of the chains 39 which may be removed from the chain so as to facilitate sharpening and replacement when necessary. The chain links are preferably of a known type which can be quite easily separated from each other when the chain is made loose, for example, by permitting the conveyor extension members 37, 37 to telescope into the main frame members 35, 35. The cutting blades 44 and 45 have sharpened forward and outer edges so that as the conveyor members 43 progress across the top of the silage, said cutters will be operative to cut the silage, the leading edges of the cross members or drag links 43 being then operative to loosen and push the cut material in the direction of travel of the conveyor chains which is such that the lower reaches of the conveyor chains and hence the drag links and cutters on the lower side of the conveyor structure move toward the center of the silo. Hence, the silage cut and loosened by the operation of the conveyor structure will be fed into the center of the silo from whence it will be discharged as will presently be explained.

For driving the conveyor chains, the shaft 34 of the conveyor is provided with a sprocket 46 which is engaged by a driving chain 47 which also engages a driving sprocket 48 on a cross shaft 49. The cross shaft 49 is journalled in a bearing 50 on a bracket secured to the ring bracket 31 and in a bearing provided in a portion of the housing of a gear reduction unit 51 which is in part supported by a supporting bracket 52 carried by certain of said hangers 32. Said gear reduction unit 51 houses a worm wheel which is secured to one end of the shaft 49 and a worm gear which is secured to a downward extension of the blower shaft 26 about which the gear reduction housing may rotate horizontally. A suitable thrust bearing (not shown) interposed between a portion of the shaft 26 and a portion of the gear reduction housing 51 on the inside thereof serves to cooperate with the bracket 52 to support said gear reduction unit at the desired elevation.

It will be seen that as an incident to rotation of the motor 23 and the lower shaft 26, the cross shaft 49 will be rotated through the agency of said gear reduction unit and that from said shaft 49, the conveyor chains will be driven through the agency of the sprocket 48, the drive chain 47 and the sprocket 46. It will also be observed that since the conveyor structure including the driving connections just described are rigidly connected to the outer race of the anti-friction bearing structure, said conveyor may rotate horizontally about the axis of said blower shaft 26 while the chains also continue their longitudinal travel approximately radially of the silo.

For driving the conveyor structure laterally, that is to say, horizontally about the axis of the blower shaft, there is provided a star wheel 53 keyed to a shaft 54 for rotation therewith, said shaft being journalled at one end in a bearing 55 provided on an extension of the cross arm 36, and at its other end in the housing of a gear drive unit 56. A worm wheel which constitutes part of the drive unit 56 is secured to a portion of said shaft 54 within said housing and said worm wheel is driven by a worm gear within said housing. Said worm gear is carried by an extension portion 38a of the outer conveyor sprocket shaft to which the conveyor sprockets are pinned or keyed so that said shaft 38 is driven incident to the driving of the conveyor chains as already explained. Through the agency of the gear drive unit 56, power is transmitted from the shaft 38 to the shaft 54 and star wheel 53 which is of such diameter that its spikes will enter the silage to thereby obtain traction so that rotation of the star wheel will cause the conveyor to travel horizontally in a circular direction.

The feeding wheel 53 which is keyed or splined on the shaft 54 may be locked in any selected position along the length of the shaft by any suitable means such as set screw 58 threaded through the hub of the star wheel for locking engagement with the shaft 54. The speed of horizontal rotation of the conveyor 30 may be regulated by adjusting the feed wheel 53 along the shaft 54. For very slow travel, the star wheel 53 is set in a position near the outer or free end of the conveyor structure and to increase the speed of travel, said star wheel is moved inwardly to any selected position nearer to the center of the silo.

The outer end of the rotating conveyor is guided and kept in predetermined spaced relation to the wall of the silo by means of a guide wheel 59 which is preferably a rubber tired wheel. Said guide wheel 59 is rotatably supported in the forked end of a mounting member 60 which is horizontally slidably mounted in a suitable socket 61 secured through the agency of the cross member 41 to the conveyor side frame members. A compression spring 62 is interposed between the bottom of the socket 61 and a shoulder or collar provided on the mounting rod 60 to resiliently urge the wheel 59 to a predetermined position while at the same time permitting a limited amount of yielding to compensate for off-center drifting of the structure and irregularities which may occur on the inside of the silo, as for example by the adherence of feed material to the wall of the silo. The conveyor is further guided by means of a centering spur 63 which may be formed from an extension of the shaft 26. The guide wheel 59 cooperates with the centering spur 63 to resist displacement of the structure incident to reaction forces incident to the resistance of the silage to movement of the cutters and drag links through the silage.

Said extension of the shaft 26 is equipped with a cutting and elevating auger 64 which is partially housed in an intake boot 65 which is carried by the rotating ring bracket 31 as shown in Figs. 3 and 4.

When the conveyor is operated, the cutters 44 and 45 move substantially radially inwardly incident to the longitudinal travel of the conveyor chains and they also travel circularly about the axis of the mechanism as an incident to the horizontal rotary movement of the conveyor structure. Hence, said cutting members and the drag plates 43 have an arcuate, more or less spiral path of travel from near the wall of the silo to the center thereof. As a result of this travel, the cutters and drag bars operate to cut the silage and to separate the cut material from the remaining uncut stock and to drag the cut and separated material toward the center of the mechanism where the cutting and lifting auger 64 will feed the loose material upwardly into said intake boot 65 which is provided with a side opening in line with the conveyor so as to facilitate delivery of the feed material into said boot.

The blower 24 operates to produce a strong air current flowing upwardly through said intake boot 65 to thereby pneumatically aid the auger 64 to lift the loose silage which is then pneumatically ejected from the blower into a discharge spout 66 which is hinged as indicated at 67 to the outlet port 68 of the blower. The hinge connection of the spout to the blower permits said spout to assume an angular position which varies incident to vertical adjustment of the mechanism in the silo. The outer end portion of said discharge spout 66 is preferably provided with an end extension portion 69 which is telescopically mounted in the main spout 66 so as to permit adjustment of the effective length of the spout as may be required. The outer end portion of the spout structure rests on the top edge of the uppermost gate 3 which remains fixed while the dispensing mechanism moves downwardly. The hinge 67 permits such downward movement of the dispensing mechanism while the outer end of the spout is held at a substantially fixed elevation. From time to time, as the descent of the dispensing mechanism progresses, the gate sections 3 are removed so that the level of the top edge of the uppermost gate will be maintained at an elevation suitable to the operating position of the dispensing mechanism.

To maintain a suitably closed condition between the spout 66 and the outlet port 68 of the blower, a gate structure 70 is pivoted as indicated at 71 to the outlet port. Said gate structure consists of a U-shaped element which will span the space between the outlet port 68 and the adjacent end of the spout 66 when the latter is disposed at an angle as represented in Figure 5.

To hold the supporting frame structure comprising the track 5 and the cross members 6, from rotating, there is provided a stabilizer bar 72 which is pivoted at its inner end on a portion of the inner rectangular frame structure 7 as indicated at 73. Said bar 72 is a telescopic, extendible bar having a longitudinally adjustable outer section 74 which is adapted to project into the delivery chute 2 of the silo and to engage against the adjacent wall thereof so as to prevent rotation of said frame and track structure. A check rest bar 75 is suitably mounted on the track 5 in underlying relation to the positions of the stabilizer bar 72 and feed chute 66 to prevent the latter from so closely approaching the track 5 as to interfere with movement of a hanger structure along said track past said stabilizer and discharge chute.

The hanger structure just referred to comprises a link or strap 76 which has its lower end connected to the outer end portion of the conveyor structure 30 through the agency of the beforementioned cross member 40. The upper end portion of said hanger 76 is provided with a flanged wheel 77 which is adapted to ride on the top of the circular track 5, and with a lower wheel 78 which is operative to engage the bottom edge of the track to prevent the flanged wheel from leaving said track. It will be seen that the conveyor is supported at its inner end from the main frame structure through the agency of its pivot shaft connection 34 and near its outer end from said frame structure by the hanger connection just described. Hence, the conveyor is not permitted to rock vertically but instead is held in predetermined, fixed relation to the frame structure. The conveyor is preferably disposed in a horizontal plane as illustrated so as to produce a flat top surface on the silage, but it may be tilted so as to produce either a conical surface or a concave surface on top of the silage, incident to the rotary movement of the conveyor.

The winch drums 16 and 20 which control the descent of the mechanism in the silo, are driven at a predetermined rate of rotation to effect lowering of the mechanism at a rate which is initially calculated to maintain the cutters and drag plates on the lower reach of the conveyor structure in the desired operative relationship to the top surface of the silage and to prevent such embedment of the cutters as would tend to stall the mechanism.

The winch drums 16 and 20 are geared together by miter gears 79 for simultaneous rotation at like speeds. The rotation imparted to the drums 16 and 20 could be a continuous slow rotation which would cause constant gradual lowering of the rotation structure. However, in view of the relatively small increments of downward movement which are required this downward movement may be effected in steps occurring once for each turn of the conveyor structure about its vertical axis of rotation. To that end, there is associated with the drum 16 a vertically disposed shaft 80 which is journalled in one or more bearings such as indicated at 81 connected to the supporting frame structure. The upper end of said shaft 80 is connected through a worm and worm wheel gear reduction unit 82 to the shaft of said winch drum 16 so that rotation imparted to the shaft 80 is also imparted to the drums 16 and 20. At its lower end, the shaft 80 has secured to it a star wheel 83, the prongs or teeth of which successively engage a roller or tooth 84 which depends from an arm which projects horizontally from the outer ball race 28. Each time that a prong of the star wheel 83 engages said roller 84 the star wheel will be caused to rotate a portion of one revolution, thereby imparting similar rotary movement to the shaft 80 and to the drums 16 and 20. Hence, it will be seen that the conveyor structure will be lowered a predetermined increment once each time that it makes a complete circuit over the surface of the silage so that a substantially level top is maintained on the silage. Since the worm and worm gear unit 82 can be driven only from the shaft 80, said unit 82 serves also to lock the drums 16 and 20 against cable dispensing rotation incident to the suspended weight of the mechanism.

When the dispensing mechanism reaches the bottom of the silo and is to be returned to the top thereof to permit refilling of the silo, the winch drums 16 and 20 may be power-driven in the proper direction to take up the cables 10 and 11 so as to thereby raise the dispensing mechanism. For that purpose, the shaft 80 is provided with a grooved pulley 86 and the blower shaft is provided with a similar but smaller grooved pulley 87. A suitable belt may be placed about these pulleys when the mechanism is to be elevated so that when the motor 21 is energized power will be transmitted from the blower shaft to the shaft 80 and thence to the drums 16 and 20 to effect the desired raising of the mechanism. Operation of the motor may conveniently be controlled by appropriate switch mechanism located at any conveniently accessible location.

A suitable flexible electric cable 88 extends from the motor 21 upwardly and around a guide pulley 89 which is mounted on one of the top cross members. Said cable then extends downwardly from the guide pulley 89 and under a weighted floating pulley 90 and thence upwardly to a fixed point from which leads may extend to switch mechanism located near the base of the silo or wherever desired. The weighted floating pulley 90 serves to take up slack in the cable so as to maintain said cable clear of the dispensing mechanism. The loop portion of the cable formed by said floating pulley 90 may be located within the silo or the feed chute 2 of the silo, or it may be arranged to be entirely outside of the silo if preferred.

If desired, the structure may be somewhat strengthened by providing truss rods or tension bars 91 connected at their inner ends to the stationary inner bearing race 27 and at their outer ends to the frame members 6 at points adjacent the track 5. Such truss members 91 will serve to prevent sagging of the central portion of the mechanism relative to the track portion.

Various modifications of the described structure may be made while retaining the principles thereof as indicated in the foregoing explanation.

I claim:

1. Mechanism adapted to be disposed within a silo for dispensing silage from such silo, comprising a main frame structure having a substantially rigid central structure and an outer, substantially circular track, means for vertically adjustably suspending said frame structure from an upper portion of a silo to thereby support said frame structure in predetermined upwardly spaced relation to the surface of silage stored in the silo, a conveyor adapted to be approximately radially disposed within the silo and having an inner end mounted on said central frame structure for horizontal rotation relative to the latter, means suspending the outer portion of said conveyor from said circular track for horizontal rotation relative to said main frame structure means for effecting horizontal rotation of said conveyor, silage cutting and propelling means carried by said conveyor and movable approximately radially inwardly to cut and drag silage over the top surface of the stored silage to the center of the silo, an axially vertically disposed centrifugal blower mounted on said central frame structure and having an axially downwardly extending intake boot disposed adjacent to the inner end of said conveyor so as to be operative to pneumatically pick up and withdraw silage moved to the center of the silo as aforesaid, an auger disposed approximately centrally of said intake boot adjacent the silage receiving end thereof for lifting the silage into said boot, an electric motor mounted on said frame structure and drivingly connected to said blower, auger and conveyor for operating the same, and means effecting adjustment of said suspending means to lower said frame structure and the parts carried thereby into operative relationship to the surface of the stored silage.

2. Silage dispensing apparatus adapted to be mounted within a silo for cutting the silage and discharging the same from the silo, comprising a frame, means for vertically adjustably and non-rotatably supporting said frame within said silo, an axially vertical blower fixedly mounted on a central portion of said frame and adapted to be disposed approximately centrally of the silo, an electric motor mounted on said frame and connected to said blower for driving the same, said blower having a downwardly facing intake and an impeller shaft extended downwardly so as to project beyond said intake for entering the silage in advance of said intake to anchor the apparatus approximately centrally of the silo, a cutting and lifting auger carried by said impeller shaft extension for elevating silage toward said intake, a conveyor mounted on said frame for horizontal rotary movement relative thereto about the axis of said impeller shaft, said conveyor having an inner end portion disposed adjacent to said auger and an outer end portion adapted to be disposed adjacent the wall of the silo, means connecting said conveyor to said blower shaft for actuating the conveyor as an incident to operation of said blower, means carried by said conveyor for cutting silage and moving the same toward said auger, means for effecting horizontal rotary movement of said conveyor, and means for adjusting said frame suspending means to regulate the vertical disposition of the apparatus so as to maintain said conveyor in predetermined operative relation to the surface of silage in the silo.

3. Silage dispensing apparatus adapted to be mounted within a silo for cutting the silage and discharging the same from the silo, comprising a frame, means for vertically adjustably and non-rotatably supporting said frame within said silo, an axially vertical blower fixedly mounted on a central portion of said frame and adapted to be disposed approximately centrally of the silo, an electric motor mounted on said frame and connected to said blower for driving the same, said blower having a downwardly facing intake and an impeller shaft extended downwardly so as to project beyond said intake for entering the silage in advance of said intake to anchor the apparatus approximately centrally of the silo, a cutting and lifting auger carried by said impeller shaft extension for elevating silage toward said intake, a conveyor mounted on said frame for horizontal rotary movement relative thereto about the axis of said impeller shaft, said conveyor having an inner end portion disposed adjacent to said auger and an outer end portion adapted to be disposed adjacent the wall of the silo, means connecting said conveyor to said blower shaft for actuating the conveyor as an incident to operation of said blower, means carried by said conveyor for cutting silage and moving the same toward said auger, means driven by said conveyor for effecting horizontal rotary movement thereof, and means for adjusting said frame suspending means to regulate the vertical disposition of the apparatus so as to maintain said conveyor in predetermined operative relation to the surface of silage in the silo.

References Cited in the file of this patent

UNITED STATES PATENTS

| Number | Name | Date |
|---|---|---|
| 892,593 | Keller | July 7, 1908 |
| 1,479,990 | Keys | Jan. 8, 1924 |
| 2,580,306 | Leach et al. | Dec. 25, 1951 |
| 2,587,714 | Embree et al. | Mar. 4, 1952 |
| 2,595,333 | Clapp | May 6, 1952 |